Figure 2:
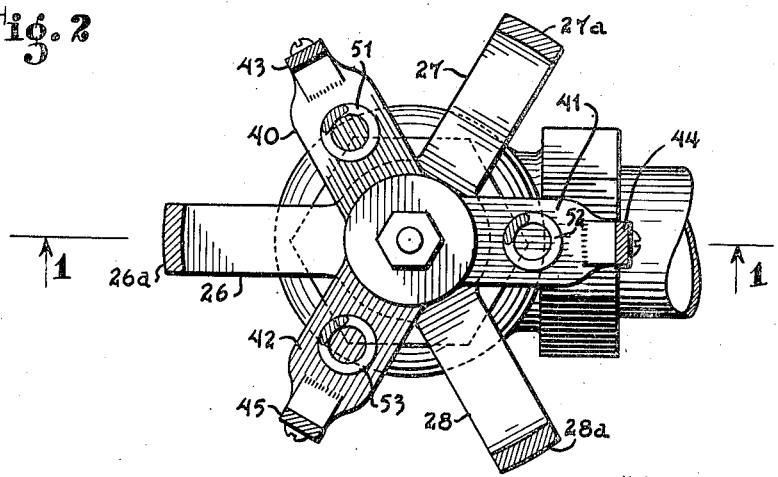

Sept. 3, 1940.　　J. M. LARSON ET AL　　2,213,785

REVERSE ACTING VALVE

Filed Aug. 12, 1937

INVENTORS
John M. Larson
Karl Figenbaum
BY
George H. Fisher
ATTORNEY

Patented Sept. 3, 1940

2,213,785

UNITED STATES PATENT OFFICE 2,213,785

REVERSE ACTING VALVE

John M. Larson and Karl Figenbaum, Chicago, Ill., assignors to Minneapolis-Honeywell Regulator Company, Minneapolis, Minn., a corporation of Delaware Application August 12, 1937, Serial No. 158,743

2 Claims. (Cl. 137—153)

This invention relates to pressure actuated controllers and is more particularly concerned with pressure actuated valves of the type utilized in pneumatic control systems.

In pneumatic control systems, it is customary to utilize what are termed "direct acting valves" which in effect are pressure actuated valves arranged in a manner to close upon an increase in pressure applied thereto. In this type of valve, a pressure motor such as a bellows is mounted in a casing secured to the valve body in alignment with the valve stem, and the end of the bellows adjacent the valve is arranged to actuate the valve stem. Thus upon an increase in pressure within the bellows, the bellows expands towards the valve body, thereby pushing the valve stem towards the valve body, which urges the valve member towards its seat due to the valve member being arranged on the same side of the valve port as the rest of the valve mechanism. Due to this convenient construction in which all of the valve mechanism can be located upon one side of the valve seat, the "direct acting" type of valve has become practically the standard form of pressure actuated valve.

In certain types of installations, however, it is undesirable to utilize direct acting valves. For instance, in some control installations it is desirable to have all of the control valves assume closed position in case of a failure of the supply of compressed air or other fluid under pressure. This requirement calls for valves which are normally closed by springs, and which open as the pressure applied thereto is increased, these valves being known in the art as "reverse acting" valves.

Heretofore, this reverse action of a pressure actuated valve has been obtained by locating the valve member upon the side of the valve port which is remote from the valve actuating mechanism. As the valve member must necessarily be larger than the valve port which it covers, it was necessary either to provide a removable valve seat which is removable as a unit with the valve body, or to provide a large opening in the valve body opposite the valve port through which the valve member could be inserted for attachment to the valve stem. These arrangements were not satisfactory, due to the additional cost involved, and to the difficulties encountered in assembling and disassembling the valves. In addition, this type of valve was unsatisfactory for modulating control due to the necessity of locating the valve member upon the inlet side of the valve port. With this arrangement, the pressure of the fluid being controlled by the valve tended to hold the valve against its seat. Thus in order to open the valve, it was necessary to apply a pressure to the diaphragm which is sufficient to overcome the force exerted by the pressure of the fluid against the valve member, and which is also sufficient to overcome the action of the springs which urge the valve against its seat. When the valve opened, however, the pressure tending to hold the valve closed would become substantially balanced, thereby causing the valve member to move quite rapidly to open position. In addition, the form of reverse acting valve above described was not suitable for use in an angle type of valve body such as a radiator valve, for the reason that the valve member would tend to choke off the supply of fluid when it is moved to what should be wide open position.

The primary object of our invention is the provision of a reverse acting pneumatic valve actuating mechanism which may be applied to any standard form of valve without changing the valve construction, and which is suitable for modulating control. Other objects of our invention comprise the various details of construction of our novel valve actuating mechanism, and will appear from the following description and the appended claims.

Figure 1:
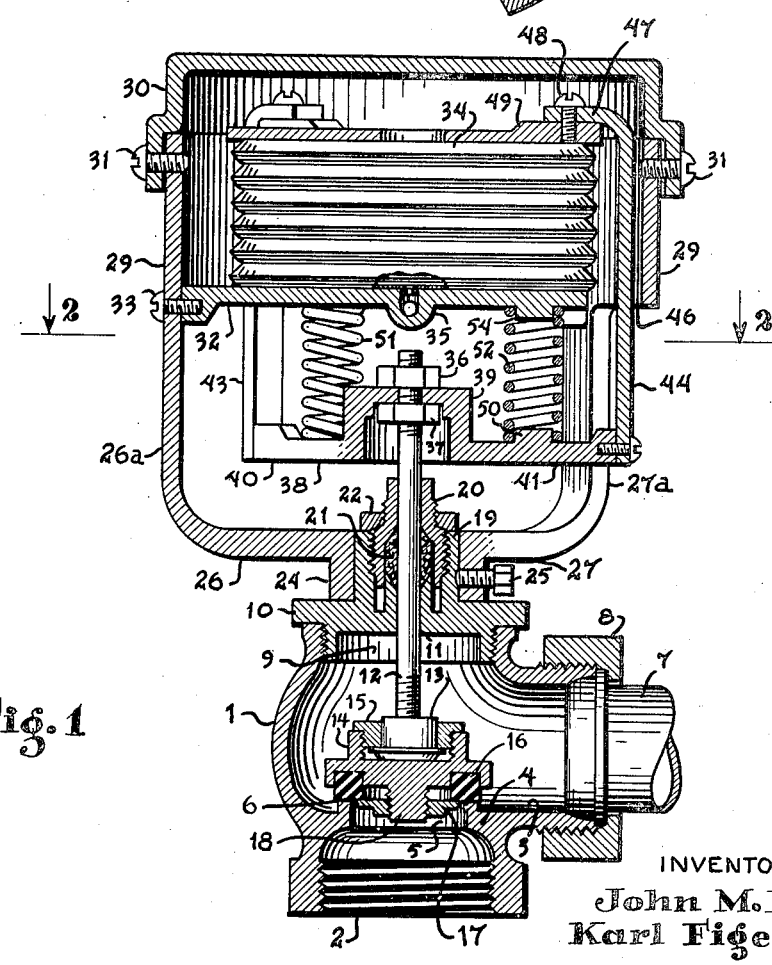

For a full disclosure of our invention, reference is made to the following detailed description and to the accompanying drawing, in which Figure 1 shows partly in section a valve actuating mechanism embodying the novel features of our invention, and Figure 2 is a view taken on line 2—2 of Figure 1.

Referring to Figure 1, reference character 1 indicates a valve body or casing having an inlet passage 2 and an outlet passage 3 which are separated by a transverse partition 4 having an opening 5 therein which forms a valve port, the upper end of this port being formed as a valve seat 6. The valve casing is shown as being of the angle type adapted for use as a radiator valve, the inlet passage 2 being provided with pipe threads for attachment to a fluid supply pipe, and the outlet passage 3 being secured to a radiator nipple or spud 7 by means of a union nut 8. The upper end of the valve body 1 is provided with an enlarged opening 9 having secured therein a closure member or bonnet 10 provided with a guide 11 for guiding the valve stem 12 which extends from within the body upwardly through the closure member. The lower end of the valve stem 12 is threaded for securing thereto a valve stem head 13 upon which the valve member 14 is secured by means of a ring nut 15. The valve member 14 is provided with an annular groove on its lower face to receive a sealing ring 16 which may be formed of hard rubber or other suitable material, this sealing ring being held in place by means of a nut 17 which is screwed to a downwardly extending projection 18 of the valve member. The sealing ring 16 is arranged to engage the valve seat 6 for providing a fluid tight fit when engaged to said valve seat.

The closure member 10 is provided on its upper face with an upwardly extending cylindrical portion 19 which is hollowed out and threaded to receive a packing nut 20 which is formed to hold suitable packing 21 against the valve stem for preventing leakage of the fluid being valved from the valve casing.

Surrounding the cylindrical portion 19 is a hub 24 to which is secured outwardly extending members 26, 27 and 28 which merge into the upwardly extending legs 26a, 27a and 28a which in turn merge into an annular diaphragm cage 29. The diaphragm cage 29 is open at its upper end and is provided with a cap 30 which may be secured to said cage in any desired manner, such as by screws 31. Secured adjacent the lower portion of the diaphragm cage 29 is a diaphragm base plate 32 which if desired may be secured to the legs 26a, 27a and 28a by means of screws such as 33. Mounted upon the diaphragm base plate 32 is a suitable form of diaphragm 34, the lower portion of which is provided with an air connection which is secured to the air passage 35 formed in the base plate 32, this air passage leading from the central portion of the base plate laterally of said base plate to the side of the diaphragm cage 29.

Attached to the upper end of the valve stem 12 by means of nuts 36 and 37 is a spider member 38 which comprises a hub portion 39 and outward extensions 40, 41 and 42 (see Figure 2). Attached to the extensions 40, 41 and 42 of the spider member are upwardly extending strips 43, 44 and 45, these strips extending through suitable openings 46 in the base plate 32 and past the diaphragm 33, and being bent at their upper ends as at 47 for attachment by screws such as 48 to a top plate 49 which is secured to the upper end of the diaphragm. The legs 40, 41 and 42 are also provided with bosses such as 50 for retaining the lower ends of springs 51, 52 and 53, respectively, the upper ends of these springs abutting the lower surface of the diaphragm base plate 32 and being secured thereto by means of bosses such as 54.

By the arrangement just described, it will be apparent that the springs 51 to 53 urge the spider member 41 downwardly, thereby urging the valve stem downwardly to cause the valve member to be urged towards closed position. Upon an increase in pressure applied to the bellows or diaphragm 34, said diaphragm will expand, thereby urging the diaphragm top plate 49 upwardly. As this plate is secured to the spider member by means of the strips 43, 44 and 45, the spider member will be urged upwardly against the action of the springs for moving the valve member away from the valve port. Therefore, when no pressure is applied to the diaphragm 34, the valve will be caused to close, and when pressure is applied to said diaphragm the valve will be opened, the degree of opening of the valve depending upon the value of pressure applied to the bellows and the design of the springs.

It should be observed that our invention provides for mounting the valve actuating mechanism on the same side of the valve port as the valve member. By this arrangement, the valve may easily be assembled as the valve member can be inserted through the opening 9 in the valve body by merely removing the closure member or bonnet 10. By this arrangement, the entire valve actuating mechanism and the valve member may be removed from the valve body as a unit. In addition, it should be noted that our novel valve actuating mechanism may be applied to any type of valve body whether it be a straight-through or angle type. Furthermore, our invention provides for retaining the valve member on the discharge side of the valve port, thereby permitting the valve member to close against the pressure of the fluid being valved, which is recognized as the proper location for the valve member. By locating the valve member on the proper side of the valve port as we have done, the valve will not be held against its seat by the pressure of the fluid being valved and consequently a satisfactory modulating action of the valve can be secured.

From the foregoing description, it will be apparent that we have provided a novel form of reverse acting valve which may be easily assembled and taken apart, which is applicable to any standard type of valve body, and which will operate satisfactorily as a modulating or graduatingly acting valve. While we have shown the spider member as comprising three extensions, it will be apparent that any desired number of such extensions may be employed. Also, while we have shown but one spring carried by each extension of the spider member, the number of springs may be varied as desired in order to secure the necessary spring rate for the use to which the valve is to be put.

While we have shown and described a preferred form of our invention, we do not wish to be limited thereto, as many modifications which are within the scope of our invention will be apparent to those skilled in the art. We therefore desire to be limited only by the scope of the appended claims and the prior art.

We claim as our invention:

1. In a pressure actuated valve mechanism, a valve casing having inlet and outlet passages separated by a partition having a valve port therein, a valve member cooperating with said valve port for controlling the flow of fluid through said valve port, a valve stem for actuating said valve member, said valve stem extending from said valve member in the same direction as the valve member moves for opening the valve port, and extending through said valve casing, sealing means associated with said valve stem and valve casing for preventing leakage of fluid from said valve casing, a diaphragm cage mounted upon said valve casing on the same side of said casing as the valve stem extends, a diaphragm base support associated with said cage, said base support extending laterally of said valve stem, a diaphragm mounted upon said base support upon the side of said support remote from said valve stem, a portion of said diaphragm being free to move, means for subjecting said diaphragm to a controlling pressure fluid, means for connecting the valve stem to the free portion of the diaphragm, said last mentioned means including a member attached to the valve stem and having a plurality of laterally extending branches, strap means attached to said branches and extending around said diaphragm, said strap means being attached to the free portion of said diaphragm.

2. In a pressure actuated valve mechanism, a valve casing having inlet and outlet passages separated by a partition having a valve port therein, a valve member cooperating with said valve port for controlling the flow of fluid through said valve port, a valve stem for actuating said valve member, said valve stem extending from said valve member in the same direction as the valve member moves for opening the valve port, and extending through said valve casing, sealing means associated with said valve stem and valve casing for preventing leakage of fluid from said valve casing, a diaphragm cage mounted upon said valve casing on the same side of said casing as the valve stem extends, a diaphragm base support associated with said cage, said base support extending laterally of said valve stem, a diaphragm mounted upon said base support upon the side of said support remote from said valve stem, a portion of said diaphragm being free to move, means for subjecting said diaphragm to a controlling pressure fluid, means for connecting the valve stem to the free portion of the diaphragm, said last mentioned means including a member attached to the valve stem and having a plurality of laterally extending branches, strap means attached to said branches and extending around said diaphragm, said strap means being attached to the free portion of said diaphragm, and means for supporting springs between said base support and a plurality of said laterally extending branches, said springs urging said valve member towards closed position.

JOHN M. LARSON.
KARL FIGENBAUM.